(12) United States Patent
Stafford et al.

(10) Patent No.: US 8,041,827 B2
(45) Date of Patent: *Oct. 18, 2011

(54) INTEROPERABILITY OF A NETWORK INTERFACE PROTOCOL WITH AN INTERNET INTERFACE PROTOCOL

(75) Inventors: William E. Stafford, San Carlos, CA (US); Raymond R. Hayes, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 12/493,386

(22) Filed: Jun. 29, 2009

(65) Prior Publication Data

US 2009/0265474 A1    Oct. 22, 2009

Related U.S. Application Data

(63) Continuation of application No. 10/633,242, filed on Aug. 1, 2003, now Pat. No. 7,574,519.

(60) Provisional application No. 60/400,610, filed on Aug. 2, 2002.

(51) Int. Cl.
   *G06F 15/16* (2006.01)
(52) U.S. Cl. ........................ 709/230; 370/480
(58) Field of Classification Search .................. None
   See application file for complete search history.

(56) References Cited

U.S. PATENT DOCUMENTS

| | | | | |
|---|---|---|---|---|
| 5,887,022 | A * | 3/1999 | Lee et al. | 375/132 |
| 6,021,433 | A * | 2/2000 | Payne et al. | 709/219 |
| 7,570,929 | B1 * | 8/2009 | Trompower | 455/114.3 |
| 7,574,519 | B2 * | 8/2009 | Stafford et al. | 709/235 |

FOREIGN PATENT DOCUMENTS

EP    942614 A2 *    9/1999

OTHER PUBLICATIONS

Chen, et al.; Some Mechanisms to Improve TCP/IP Performance over Wireless and Mobile Computing Environment; Seventh International Conference on Parallel and Distributed Systems; 2000 Proceedings; Jul. 4-7, 2000; pp. 437-444.
Wang, et al.; Use of TCP Decoupling in Improving TCP Performance over Wireless Networks; Wireless Networks, ACM; May 1, 2001; pp. 221-236; vol. 7, No. 3; New York, NY, US.
Balakrishnan, et al.; A Comparison of Mechanisms for Improving TCP Performance over Wireless Links; IEEE/ACM Transactions on Networking; Dec. 1997; pp. 756-769; vol. 5, Issue 6.
European Search Report dated Sep. 15, 2009; EP Application No. 03017443.7.

* cited by examiner

*Primary Examiner* — Jeffrey R Swearingen
(74) *Attorney, Agent, or Firm* — Garlick Harrison & Markison; Jessica W. Smith (57) ABSTRACT

A method for interoperability of a network interface protocol with an Internet interface protocol begins by receiving a scan channel request of a plurality of channels that are in accordance with the network interface protocol. The method then continues by determining whether an Internet packet is being received via one of the plurality of channels when the channel scan request is received (i.e., is a higher layer protocol supporting a current transmission). If so, the method continues by scanning at least one channel of the plurality of channels, but does not scan all of the plurality of channels at one time. The method continues after the scanning by tuning to the channel supporting the higher layer protocol communication to transmit at least one outbound Internet packet. The method then continues by scanning at least another channel of the plurality of channels.

18 Claims, 6 Drawing Sheets

FIG. 1
WLAN 10

INTEROPERABILITY OF A NETWORK INTERFACE PROTOCOL WITH AN INTERNET INTERFACE PROTOCOL

CROSS-REFERENCE TO RELATED APPLICATIONS

The present U.S. Utility patent application claims priority pursuant to 35 U.S.C. §120, as a continuation, to the following U.S. Utility Patent Application which is hereby incorporated herein by reference in its entirety and made part of the present U.S. Utility Patent Application for all purposes:

U.S. Utility application Ser. No. 10/633,242, entitled "Interoperability of a Network Interface Protocol with an Internet Interface Protocol," now U.S. Pat. No. 7,574,519, filed Aug. 1, 2003, which is hereby incorporated herein by reference in its entirety and made part of the present U.S. Utility Patent Application for all purposes, which claims priority pursuant to 35 U.S.C. §119(e) to the following U.S. Provisional Patent Application which is hereby incorporated herein by reference in its entirety and made part of the present U.S. Utility Patent Application for all purposes:

U.S. Provisional Application Ser. No. 60/400,610, entitled "Interoperability of a Network Interface Protocol with an Internet Interface Protocol," filed Aug. 2, 2002, expired.

BACKGROUND OF THE INVENTION

1. Technical Field of the Invention

This invention relates generally to communication systems and more particularly to wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In wireless networks, such 802.11 networks, the wireless transceiver (e.g., the client station) is required to occasionally scan the available channels to see whether there are other nodes with which to communicate (i.e., other channels are supporting data of interest to the wireless communication device). Because of the nature of wireless networks, the scanning process requires that the station to temporarily leave the channel that is supporting a current communication by tuning and listening to one or more different channels to determine if there is any interest in association with one of these other channels. A significant period of time is required to make such a determination for each channel. In many wireless local area networks (WLAN), multiple frequencies and/or network interface protocols may be used (e.g., IEEE 802.11b, IEEE 802.11a, and/or IEEE 802.11g protocols), which increases the number of channels that must be scanned and correspondingly increases the time it takes to scan all of the channels.

While the time it takes to scan multiple channels over multiple network interface protocols, the data throughput performance impact on the station is modest. However, the data throughput for higher layer protocols, such as Transmission Control Protocol/Internet Protocol (TCP/IP) may be significantly impacted. Such a significant impact results because TCP/IP measures the time that expires from when a source sends a packet to a destination until the source receives an acknowledgement (ACK) from the destination that it received the packet. If the time is greater than expected (e.g., a few hundred milliseconds plus some tolerance that accounts for reasonable transmission time variations), TCP/IP may interpret this as congestion (i.e., the network infrastructure is overworked and is slow in transferring packets). When congestion is suspected, TCP/IP uses a multiplicative decrease congestion avoidance algorithm that dramatically reduces the transmission rate of packets from the source to the destination. When the congestion is reduced, TCP/IP uses a slow start algorithm that slowly increases the packet rate between the source and the destination.

Unfortunately, TCP/IP cannot determine between actual congestion of the network and when the station is scanning other channels and not supporting the TCP/IP packet transmissions. If the station is scanning other channels for a significant period of time (e.g., a few hundred milliseconds), TCP/IP may view this absence of support as congestion and evoke the multiplicative decrease congestion avoidance algorithm. As such, the TCP/IP throughput is unnecessarily reduced.

Therefore, a need exists for a method and apparatus for interoperability of a network interface protocol with an Internet interface protocol to ensure data high throughput of the higher layer Internet interface protocol.

BRIEF SUMMARY OF THE INVENTION

The interoperability of a network interface protocol with an Internet interface protocol of the present invention substantially meets these needs and others. In an embodiment of a method for interoperability of a network interface protocol with an Internet interface protocol, the method begins by receiving a scan channel request of a plurality of channels that are in accordance with the network interface protocol. For example, the channels may be in accordance with IEEE 802.11a, IEEE 802.11b, and/or IEEE 802.11g. The method then continues by determining whether an Internet packet is being received via one of the plurality of channels when the channel scan request is received (i.e., is a higher layer protocol supporting a current transmission). If so, the method continues by scanning at least one channel of the plurality of channels, but does not scan all of the plurality of channels at one time. The method continues after the scanning by tuning to the channel supporting the higher layer protocol communication to transmit at least one outbound Internet packet. The method then continues by scanning at least another channel of the plurality of channels.

Another embodiment of a method for interoperability of a network interface protocol with an Internet Protocol to ensure high data throughput begins by receiving a network interface protocol channel scan request when a Transmission Control Protocol (TCP) connection is established between a source and a destination. The method continues by hopping between a channel supporting the TCP connection within a wireless local area network (WLAN) and other channels of the WLAN to avoid excess latency in acknowledging receipt of a packet formatted in accordance with the Internet Protocol or a portion of the packet during scanning of the other channels of the WLAN.

Various embodiments of communication devices and wireless network interface modules may be derived by including processing modules and memory to execute at least one of the methods for interoperability of a network interface protocol with an Internet Protocol. By implementing such a method, excessive delays in supporting higher layer protocols, such as TCP/IP, by lower layer protocols, such as IEEE 802.11a, IEEE 802.11b, and/or IEEE 802.11g, that result from scanning other channels are substantially eliminated, thus the transmission rate of packets of the higher layer protocol is not unnecessarily reduced.

DETAILED DESCRIPTION OF THE INVENTION

Figure 1:
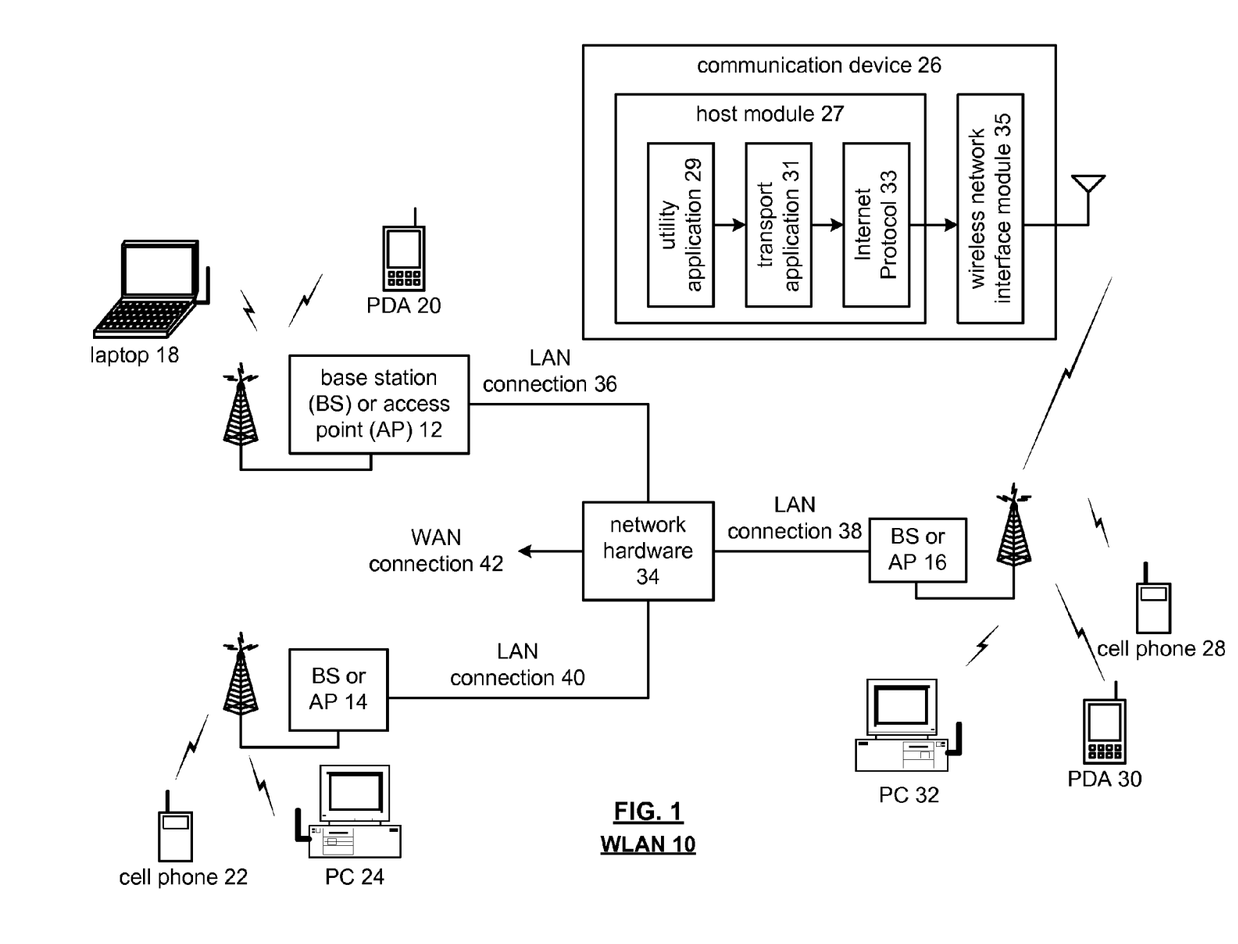
FIG. 1 is a schematic block diagram of a wireless communication system in accordance with the present invention.

FIG. 1 is a schematic block diagram illustrating a wireless local area network (WLAN) 10 that includes a plurality of base stations and/or access points 12-16, a plurality of wireless communication devices 18-32 and a network hardware component 34. The wireless communication devices 18-32 may be laptop computers 18, personal digital assistants 20 and 30, personal computers 24 and 32 and/or cellular telephones 22 and 28. Communication device 26, which is representative of the other communication devices 18-32, includes a host module 27 and a wireless network interface module 35. The host module 27, which includes a processing module and memory, executes a utility application 29 (e.g., word processing, email, etc.), a transport application 31 (e.g., browser, etc.), and an Internet protocol application 33 (e.g., TCP/IP).

In general, the utility application generates data that is packetized by the transport application. The Internet protocol application 33 generates datagrams from the packets and provides the datagrams to the wireless network interface module 35. The wireless network interface module 35 processes the datagrams in accordance with a network interface protocol, such as IEEE 802.11a, IEEE 802.11b, and IEEE 802.11g, and transceives the datagrams with an access point or base station. The wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
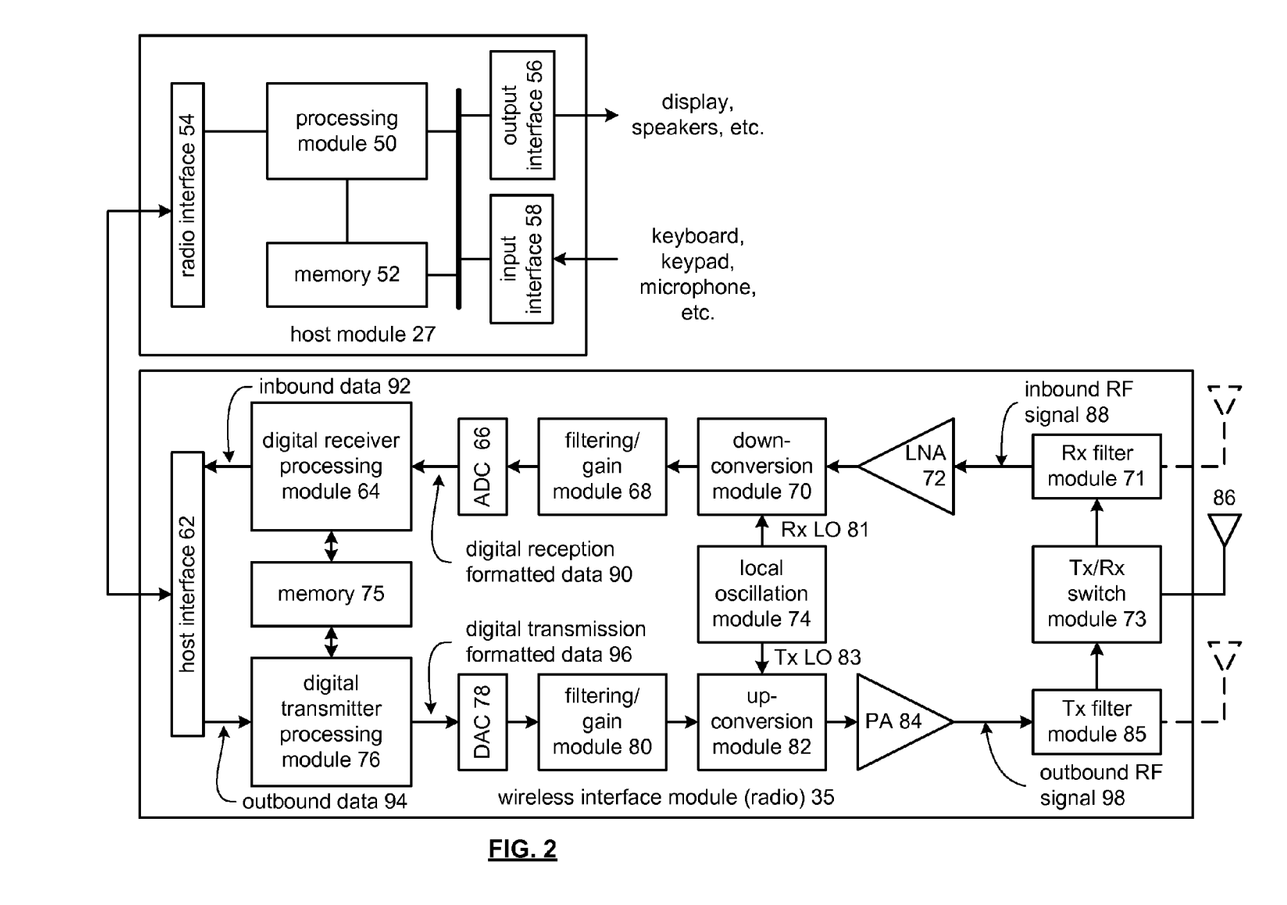
FIG. 2 is a schematic block diagram of a wireless communication device in accordance with the present invention.

FIG. 2 is a schematic block diagram illustrating a wireless communication device that includes the host module 27 and an associated radio or wireless interface module 35. For cellular telephone hosts, the radio 35 is a built-in component. For personal digital assistants hosts, laptop hosts, and/or personal computer hosts, the radio 60 may be built-in or an externally coupled component.

As illustrated, the host module 27 includes a processing module 50, memory 52, radio interface 54, input interface 58 and output interface 56. The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 52 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 50 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The processing module 50 and memory 52 execute the corresponding instructions that are typically done by the host module. For example, for a cellular telephone, the processing module 50 performs the corresponding communication functions in accordance with a particular cellular telephone standard.

The radio interface 54 allows data to be received from and sent to the radio 35. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 35. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 35, which is compliant with one or more wireless network interface protocols (e.g., IEEE 802.11a, b, and/or g), includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 35 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 35 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host module 27 via the radio interface 54.

As one of average skill in the art will appreciate, the wireless communication device of FIG. 2 may be implemented using one or more integrated circuits. For example, the host module 27 may be implemented on one integrated circuit, the digital receiver processing module 64, the digital transmitter processing module 76 and memory 75 may be implemented on a second integrated circuit, and the remaining components of the radio 35, less the antenna 86, may be implemented on a third integrated circuit. As an alternate example, the radio 35 may be implemented on a single integrated circuit. As yet another example, the processing module 50 of the host module 27 and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
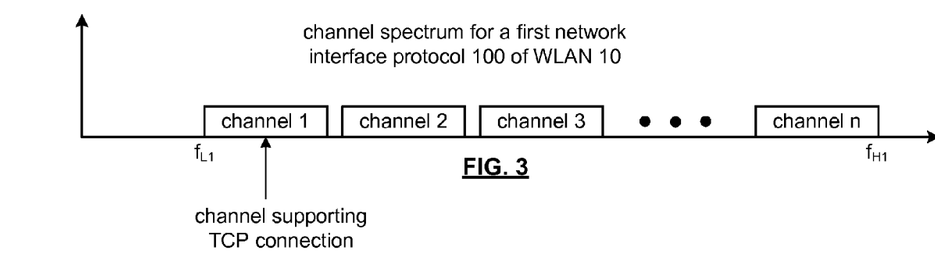
FIGS. 3 and 4 are examples of channel spectrums for various network interface protocols.
Figure 4:
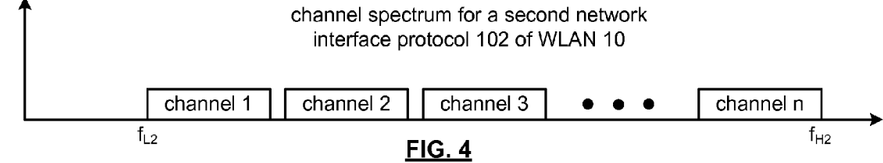

FIGS. 3 and 4 are examples of channel spectrums for various network interface protocols 100 and 102 (e.g., IEEE 802.11a, b, and/or g). As shown, each network interface protocols includes a plurality of channels. In this example, channel 1 of FIG. 3 is supporting a TCP connection, i.e., supporting the higher layer protocol communication. As such, when the wireless network interface module 35 receives a scan request from the host module 27, it scans all of the remaining channels of FIG. 3 and all of the channels in FIG. 4.

Figure 5:
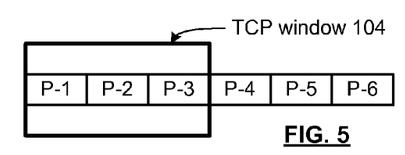
FIGS. 5-7 are an example of Internet interface protocol packet transmissions.
Figure 6:
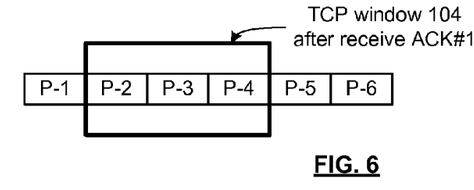
Figure 7:
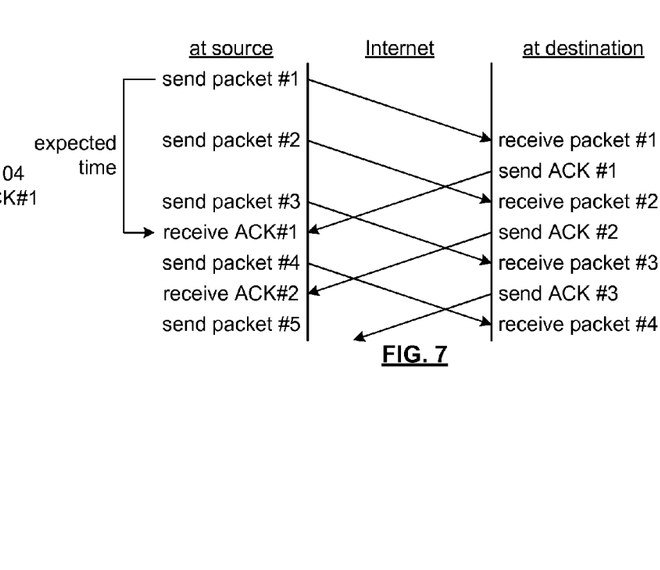

FIGS. 5-7 are an example of Internet interface protocol (e.g., TCP/IP) packet transmissions. As shown in FIG. 5, several packets (P-1 through P-6) are ready for transmission from the source to the destination. As is also shown, the TCP window 104 is sized to allow three packets to be transmitted and awaiting an acknowledgement of receipt from the destination. The sizing of the TCP window 104 is based on several factors including feedback from the destination regarding a transmission rate which it can handle, congestion of the network, and congestion response algorithms (e.g., slow start and multiplicative decrease congestion avoidance).

As shown in FIG. 7, the source sends packets 1-3 in a sequential manner via the Internet to the destination. Based on a round trip time estimation algorithm, the source expects to receive an ACK of each packet within a given time plus some tolerance to account for reasonable transmission rate variations. If the ACK is received in the expected time, for example, the source receives ACK #1 from the destination in the expected time, the TCP winding 104 shifts one packet as shown in FIG. 6. As such, the next packet, packet #4 in this example, is transmitted.

As can be seen in the example of FIG. 7, an efficient pipeline packet transmission scheme can be established as long as ACKs are received within the specified time. If, however, an ACK is not received within the expected time, the TCP/IP algorithm of the source deems this to be a transmission failure and retransmits the packet, even if the ACK is received after the expected time. In addition, the TCP/IP algorithm interprets the failure to be caused by congestion of the network and evokes the multiplicative decrease congestion avoidance algorithm, which quickly reduces the packet transmission rate.

Figure 8:
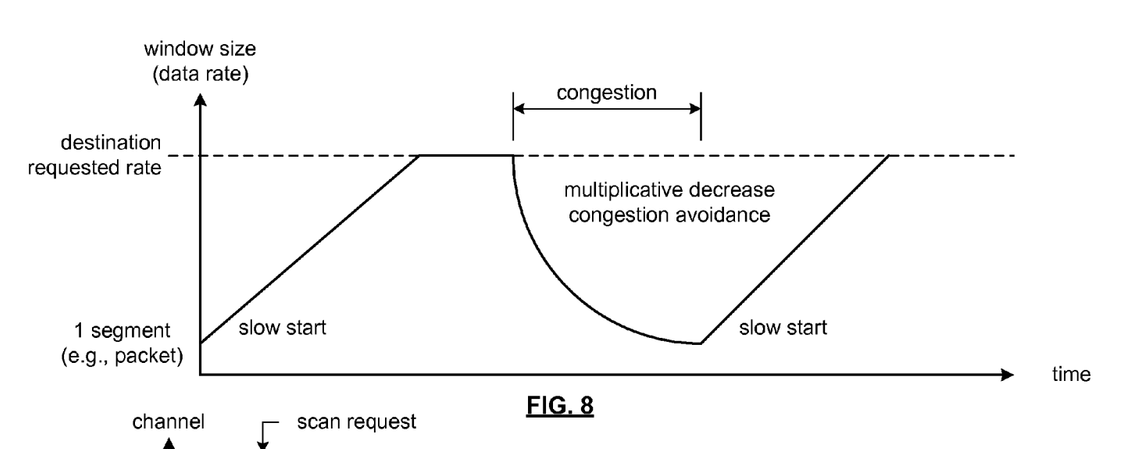
FIG. 8 is a graph of packet rate adjustment of the Internet interface protocol.

FIG. 8 is a graph of packet rate adjustment of the Internet interface protocol (e.g., TCP/IP). As shown, the maximum rate of transmission, which corresponds to the window size, is the rate specified by the destination. When a TCP connection between a source and destination is first established, the TCP algorithm enables the transmission at a low rate (e.g., one segment, which may be a packet or group of packets). Provide no congestion is detected, the rate of transmission increases linearly until the requested rate is achieved. The transmission rate will remain at the specified rate until the destination changes it, the TCP connection is cancelled, or congestion (real of false) is detected. Note that real congestion is a result of actual congestion of the network, where false congestion is unwanted delay added by the wireless network interface module scanning other channels for too long and not supporting the TCP connection.

When congestion is detected, the multiplicative decrease congestion avoidance algorithm is evoked, which reduces the window size and increases the expected time for receiving an ACK. As such, the data rate decreases rapidly to quickly reduce congestion. Once the congestion has bee alleviated, the data rate (i.e., the window size and expected time for ACK) is increased. slowly. To avoid evoking the multiplicative decrease congestion avoidance algorithm due to false congestion, the scheme of FIGS. 9-11 may be employed.

Figure 9:
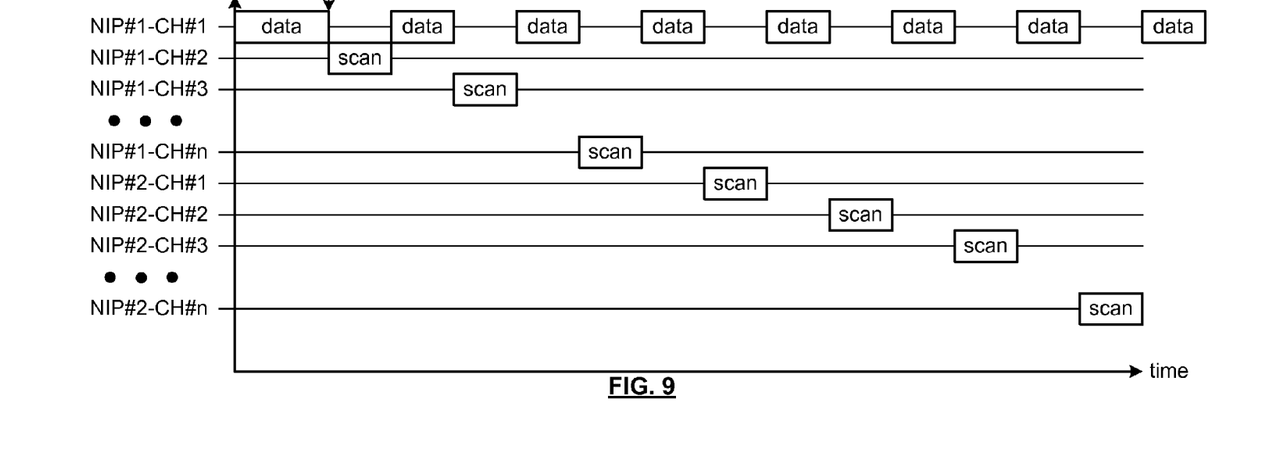
FIG. 9 is a graph of interoperability of a network interface protocol with an Internet interface protocol to ensure a high data throughput in accordance with the present invention.

FIG. 9 is a graph of interoperability of a network interface protocol with an Internet interface protocol to ensure a high data throughput of the higher layer Internet interface protocol (e.g., TCP/IP). As shown, channel #1 (CH#1) of the first network interface protocol (NIP#1) is supporting the TCP connection, i.e., is supporting the TCP/IP layer. When a scan request is received, the network interface module 35 toggles between scanning the remaining channels of the first network interface protocol and all of the channels of the other network interface protocols and supporting the TCP/IP layer. As such, delays incurred by scanning the other channels are minimal and false congestion is avoided.

Figure 10:
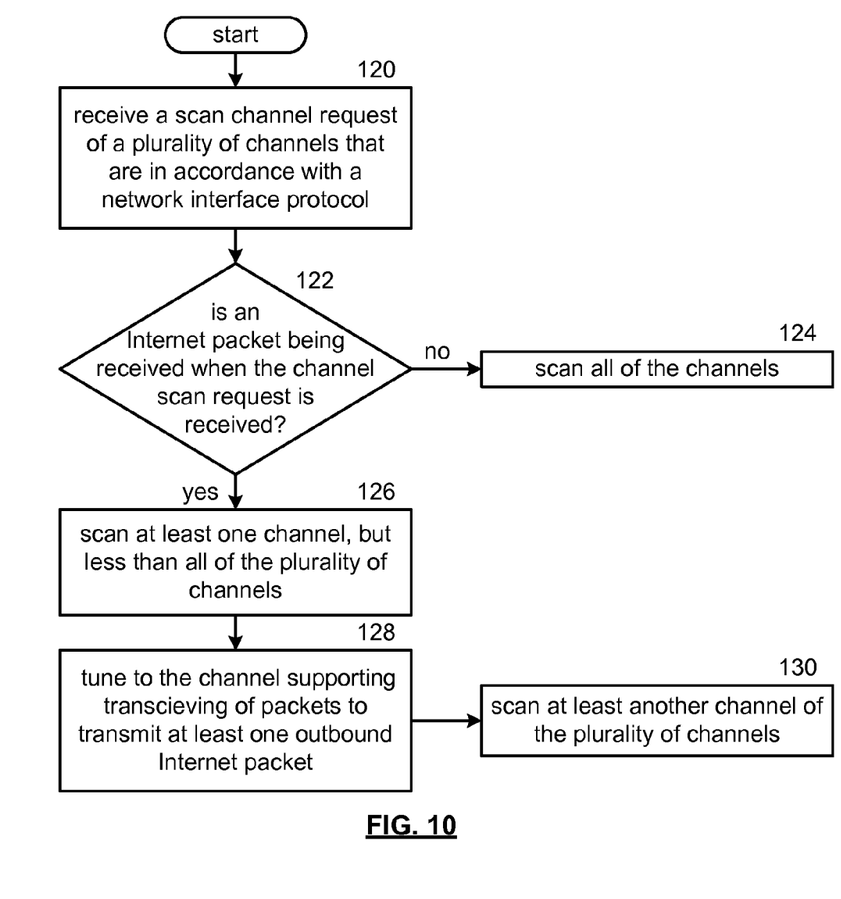
FIG. 10 is a logic diagram of a method for interoperability of a network interface protocol with an Internet interface protocol to ensure a high data throughput in accordance with the present invention.

FIG. 10 is a logic diagram of a method for interoperability of a network interface protocol with an Internet interface protocol to ensure a high data throughput. The method begins at step 120 where a scan channel request is received, wherein the scan channel request requests scanning a plurality of channels that are in accordance with the network interface protocol (e.g., of IEEE 802.11a, IEEE 802.11b, and/or IEEE 802.11g). Note that the channel scan request may be received periodically from a host device to determine whether another one of the plurality of channels contains data of interest to the host device.

The method precedes to step 122 where a determination is made as to whether an Internet packet (e.g., a datagram in accordance with the TCP/IP standard) is being received via one of the plurality of channels when the channel scan request is received (e.g., does a TCP connection between a source and destination exist?). If not, the method precedes to step 124, where all of the channels are scanned. If, however, and Internet packet is being received when the channel scan request is received, the method precedes to step 126, where at least one other channel of the plurality of channels, but not all of the plurality of channels are scanned. The number of channels scanned may ranged from 1 to n, where the number to scan is primarily based on the acceptable delay in supporting the TCP/IP layer.

The method precedes to step 128, where the network interface module is tuned to the one of the plurality of channels to transmit at least one outbound Internet packet. The network interface module may also support receiving at least one inbound Internet packet during this time period. The method then precedes to step 130, where the network interface module scans at least another channel of the plurality of channels. The toggling between scanning channels and supporting the TCP/IP layer continues until all of the channels have been scanned.

Figure 11:
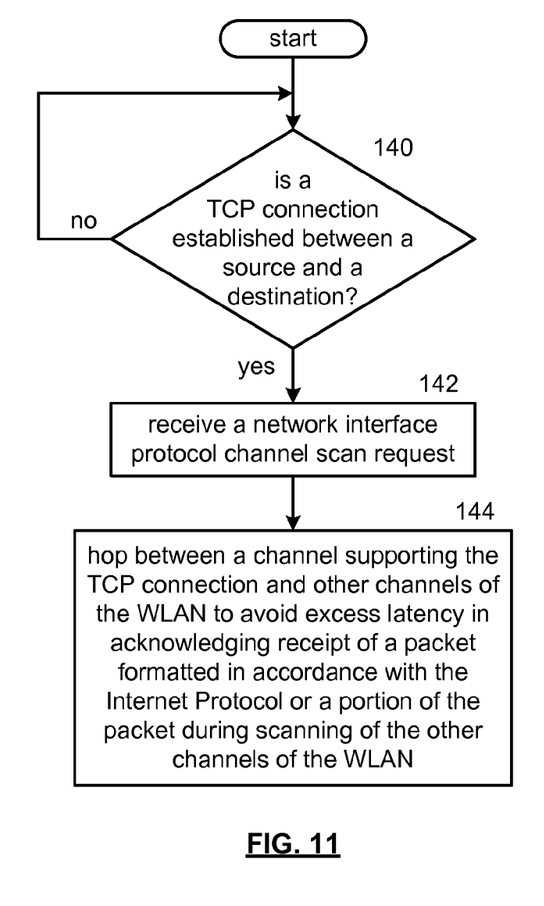
FIG. 11 is a logic diagram of another method for interoperability of a network interface protocol with an Internet interface protocol to ensure a high data throughput in accordance with the present invention

FIG. 11 is a logic diagram of another method for interoperability of a network interface protocol with an Internet interface protocol to ensure a high data throughput. The method begins at step 140 where a determination is made as to whether a Transmission Control Protocol (TCP) connection is established between a source and a destination. If so, the method precedes to step 142, where a network interface protocol channel scan request is received.

The method then precedes to step 144 where the network interface module hops between a channel supporting the TCP connection within a wireless local area network (WLAN) and other channels of the WLAN to avoid excess latency in acknowledging receipt of a packet formatted in accordance with the Internet Protocol or a portion of the packet during scanning of the other channels of the WLAN.

The preceding discussion has presented a method and apparatus for interoperability of a network interface protocol with an Internet interface protocol to ensure a high data throughput. By having the network interface module toggle between supporting high layer protocols and supporting channel scan requests, the data throughput of the high layer protocols (e.g., the Internet protocol) remains at an optimal level since false congestion, delays resulting from the wireless network interface module not supporting the higher layer protocol while scanning other channels, is avoided. As one of average skill in the art will appreciate, other embodiments may be derived from the teachings of the present invention without deviating from the scope of the claims.

What is claimed is:

1. A method for interoperability of a wireless network interface protocol with an Internet interface protocol to ensure a high data throughput, the method comprises:
   receiving a channel scan request of a plurality of channels that are in accordance with the network interface protocol;
   determining whether an Internet packet is being received via one of the plurality of channels when the channel scan request is received;
   when the Internet packet is being received via one of the plurality of channels when the channel scan request is received, scanning at least one other channel of the plurality of channels, but less than all of the plurality of channels;
   after scanning the at least one other channel, tuning to the one of the plurality of channels and transmitting at least one outbound Internet packet; and
   scanning at least another channel of the plurality of channels.

2. The method of claim 1, wherein the receiving a channel scan request further comprises:
   periodically receiving the channel scan request from a host device to determine whether another one of the plurality of channels contains data of interest to the host device.

3. The method of claim 1, wherein the determining whether the Internet packet is being received further comprises:
   determining that a source of the Internet packet and a destination of the Internet packet have established a Transmission Control Protocol (TCP) connection.

4. The method of claim 3, wherein the Internet packet is formatted in accordance with an Internet Protocol (IP), such that the Internet interface protocol is in accordance with a TCP/IP protocol.

5. The method of claim 1 further comprises, after scanning the at least another channel of the plurality of channels:
   determining whether each of the plurality of channels have been scanned;
   when each of the plurality of channels have not been scanned, tuning to the one of the plurality of channels to transmit at least one further Internet packet; and
   continuing between scanning channels of the plurality of channels and tuning to the one of the plurality of channels until each of the plurality of channels has been scanned.

6. The method of claim 1, wherein the network interface protocol is in accordance with at least one of IEEE 802.11a, IEEE 802.11b, and IEEE 802.11g.

7. The method of claim 1, wherein the tuning to the one of the plurality of channels to transmit at least one outbound Internet packet further comprises:
   receiving at least one additional Internet packet.

8. A communication device comprises:
   wireless network interface module to provide connectivity to a wireless local area network (WLAN) in accordance with at least one wireless network interface protocol, wherein the WLAN is coupled to an Internet, and wherein the connectivity is provided via one of a plurality of channels of the WLAN;
   processing module operably coupled to transceive datagrams to and from the Internet via the wireless network interface module; and
   memory operably coupled to the processing module, wherein the memory stores operational instructions that cause the processing module to:
   process data in accordance with an utility application to produce a message;
   process the message in accordance with a transport application to produce a packet;
   process the packet in accordance with an Internet Protocol to produce at least one outbound datagram;
   generate a channel scan request in accordance with the transport application;
   determine whether one of the datagrams is being received when the channel scan request is generated;
   when the one of the datagrams is being received when the channel scan request is received, scan at least one other channel of the plurality of channels, but less than all of the plurality of channels;
   after scanning the at least one other channel, tune to one of the plurality of channels and transmitting at least one outbound datagram; and
   scanning at least another channel of the plurality of channels.

9. The communication device of claim 8, wherein the memory further comprises operational instructions corresponding to an operating system of a computer, wherein the transport application is included in the operating system.

10. The communication device of claim 8, wherein the memory further comprises operational instructions that cause the processing module to determine whether the datagram is being received further comprises:

determining that a source of the datagram and the communication device have established a Transmission Control Protocol (TCP) connection.

11. The communication device of claim 8, wherein the memory further comprises operational instructions that cause the processing module to, after scanning the at least another channel of the plurality of channels:
- determine whether each of the plurality of channels have been scanned;
- when each of the plurality of channels have not been scanned, tune to the one of the plurality of channels to transmit at least one additional outbound datagram; and
- continue between scanning channels of the plurality of channels and tuning to the one of the plurality of channels until said each of the plurality of channels has been scanned.

12. The communication device of claim 8, wherein the at least one wireless network interface protocol is in accordance with at least one of IEEE 802.11a, IEEE 802.11b, and IEEE 802.11g.

13. The communication device of claim 8, wherein the memory further comprises operational instructions that cause the processing module to tune to the one of the plurality of channels to transmit at least one outbound datagram further comprises:
- receive at least one additional datagram.

14. A wireless network interface module comprises:
processing module; and
memory operably coupled to the processing module, wherein the memory stores operational instructions that cause the processing module to:
- receive a channel scan request in accordance with a transport application;
- determine whether at least one datagram is being received on one of a plurality of channels when the channel scan request is generated;
- when the at least one datagram is being received when the channel scan request is received, scan at least one other channel of the plurality of channels, but less than all of the plurality of channels;
- after scanning the at least one other channel, tune to the one of the plurality of channels and transmitting at least one outbound datagram; and
- scanning at least another channel of the plurality of channels.

15. The wireless network interface module of claim 14, wherein the memory further comprises operational instructions that cause the processing module to determine whether the datagram is being received further comprises:
- determining that a source of the at least one datagram and a communication device incorporating the wireless network interface module have established a Transmission Control Protocol (TCP) connection.

16. The wireless network interface module of claim 14, wherein the memory further comprises operational instructions that cause the processing module to, after scanning the at least another channel of the plurality of channels:
- determine whether each of the plurality of channels have been scanned;
- when each of the plurality of channels have not been scanned, tune to the one of the plurality of channels to transmit at least one additional outbound datagram; and
- continue between scanning channels of the plurality of channels and tuning to the one of the plurality of channels until each of the plurality of channels has been scanned.

17. The wireless network interface module of claim 14 operates in accordance with at least one of IEEE 802.11a, IEEE 802.11b, and IEEE 802.11g.

18. The wireless network interface module of claim 14, wherein the memory further comprises operational instructions that cause the processing module to tune to the one of the plurality of channels to transmit at least one outbound datagram further comprises:
- receive at least one additional datagram.

* * * * *